US012789236B2

(12) United States Patent
Imamura et al.

(10) Patent No.: US 12,789,236 B2
(45) Date of Patent: Nov. 10, 2026

(54) SORTING DEVICE

(71) Applicant: KANADEVIA CORPORATION, Osaka (JP)

(72) Inventors: Akira Imamura, Osaka (JP); Fumiya Hashimoto, Osaka (JP); Takayasu Yokobayashi, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 114 days.

(21) Appl. No.: 18/871,385

(22) PCT Filed: Jun. 7, 2023

(86) PCT No.: PCT/JP2023/021120

§ 371 (c)(1),
(2) Date: Dec. 3, 2024

(87) PCT Pub. No.: WO2024/018771

PCT Pub. Date: Jan. 25, 2024

(65) Prior Publication Data

US 2026/0241418 A1 Aug. 20, 2026

(30) Foreign Application Priority Data

Jul. 19, 2022 (JP) ................................. 2022-114448

(51) Int. Cl.
*B07C 5/36* (2006.01)
*B07C 5/342* (2006.01)

(52) U.S. Cl.
CPC ............ *B07C 5/365* (2013.01); *B07C 5/3425* (2013.01)

(58) Field of Classification Search
CPC ......... B07C 5/365; B07C 5/367; B07C 5/368; B65G 53/14

(Continued)

(56) References Cited

U.S. PATENT DOCUMENTS 5,135,114 A * 8/1992 Satake .................. B07C 5/3416 209/558
2021/0179366 A1* 6/2021 McCoy, Jr. .......... B65G 47/918

FOREIGN PATENT DOCUMENTS

CN 109894377 A * 6/2019
JP 02-179452 A 7/1990

(Continued)

OTHER PUBLICATIONS

Shi; Jian, "Belt Conveying Device and Automatic Silicone Material Sorting System" (English Translation), Jun. 18, 2019, worldwide. espacenet.com (Year: 2019).*

(Continued)

*Primary Examiner* — Molly K Devine
(74) *Attorney, Agent, or Firm* — CUSHMAN PARTNERS LLC

(57) ABSTRACT

Provided is a sorting device that avoids being unable to sort a conforming granular particle from among a plurality of granular particles. A sorting device includes: an identification unit that identifies a non-conforming granular particle in an image obtained by taking an image of a plurality of granular particles, the non-conforming granular particle being a granular particle that does not conform to a standard; and a housing. The housing has a plurality of discharge areas, a suction path, and an introduction path. The discharge areas are arranged to divide the plurality of granular particles into a plurality of groups. The suction path is communication with a discharge area, and air in a discharge area assigned a group including the non-conforming granular particle and granular particles in the discharge area assigned the group including the non-conforming granular particle are sucked into the suction path. The introduction path is in communication with a discharge area, and air outside of the (Continued)

discharge area is introduced to the discharge area through the introduction path.

16 Claims, 8 Drawing Sheets

(58) Field of Classification Search
USPC .................................................. 209/576, 643
See application file for complete search history.

(56) References Cited

FOREIGN PATENT DOCUMENTS

| | | | |
|---|---|---|---|
| JP | 3666253 | B2 | 6/2005 |
| JP | 2006-055762 | A | 3/2006 |
| JP | 2007-040818 | A | 2/2007 |
| JP | 4353871 | B2 | 8/2009 |
| JP | 2013-059718 | A | 4/2013 |
| JP | 5864488 | B2 | 2/2016 |

OTHER PUBLICATIONS

International Search Report dated Jul. 11, 2023, issued in corresponding International Application No. PCT/JP2023/021120 with English translation (4 pgs.).

* cited by examiner

SORTING DEVICE

CROSS-REFERENCE TO RELATED APPLICATIONS

This application is the U.S. National Stage of PCT/JP2023/021120, filed Jun. 7, 2023, which claims priority to Japanese Patent Application No. 2022-0114448, filed Jul. 19, 2022, the entire contents of both of which are herein incorporated by reference in their entireties.

TECHNICAL FIELD

The present invention relates to a sorting device that sorts only a granular particle conforming to a standard from among a plurality of granular particles that can be blown off by the wind by removing a granular particle that does not conform to the standard from the plurality of granular particles.

BACKGROUND ART

For a granular particle, such as grains of wheat, a certain standard for shipment is set. Any granular particle (non-conforming granular particle) that does not conform to the standard is removed from a plurality of granular particles before shipment.

Granular particles, such as grains of wheat, are characteristically so light that the granular particles are blown off by the wind. By taking advantage of this characteristic, sorting devices disclosed in Japanese U.S. Pat. No. 4,353,871 (Patent Literature 1, hereinafter), Japanese U.S. Pat. No. 5,864,488 (Patent Literature 2, hereinafter), and Japanese U.S. Pat. No. 3,666,253 (Patent Literature 3, hereinafter) use a nozzle for sucking air to suck and remove any non-conforming granular particle from a plurality of granular particles, thereby sorting a granular particle (conforming granular particle) conforming to a standard from among the plurality of granular particles.

SUMMARY OF INVENTION

Technical Problem

However, the sorting devices disclosed in Patent Literatures 1 to 3 may be unable to sort a conforming granular particle from a plurality of granular particles under two circumstances described below.

First, with the sorting devices disclosed in Patent Literatures 1 to 3, granular particles are sucked into a nozzle. However, an excessive number of granular particles may be sucked into the nozzle, and the nozzle may be clogged with the granular particles. When the nozzle is clogged with the granular particles, and air cannot pass through a path for granular particles and air downstream of the suction inlet of the nozzle, the nozzle can no longer suck in granular particles. When the nozzle cannot suck in granular particles, non-conforming granular particles cannot be removed from the plurality of granular particles, and conforming granular particles cannot be sorted from among the plurality of granular particles.

Second, with the sorting devices disclosed in Patent Literatures 1 to 3, the plurality of granular particles are conveyed by a belt conveyor. However, when the granular particles on the belt conveyor are sucked into the nozzle, a part of the belt of the belt conveyor may be sucked by the nozzle and lifted. When a part of the belt is lifted, the granular particles on the belt conveyor are scattered off the belt conveyor, and conforming granular particles cannot be sorted from among the plurality of granular particles, since there are no granular particles on the belt conveyor.

In view of this, an object of the present invention is to provide a sorting device that avoids being unable to sort a conforming granular particle from among a plurality of granular particles.

Solution to Problem

A sorting device according to the present invention includes: an identification unit that identifies a non-conforming granular particle in an image obtained by taking an image of a plurality of granular particles, the non-conforming granular particle being a granular particle that does not conform to a standard; and a housing. The housing has: a plurality of discharge areas arranged to divide the plurality of granular particles into a plurality of groups; a suction path that is in communication with a discharge area, air in a discharge area assigned a group including the non-conforming granular particle and granular particles in the discharge area assigned the group including the non-conforming granular particle being sucked into the suction path; and an introduction path that is in communication with a discharge area, air outside of the discharge area being introduced to the discharge area through the introduction path.

Advantageous Effects of Invention

With the sorting device according to the present invention, a non-conforming granular particle in a discharge area assigned a group of granular particles including the non-conforming granular particle is borne to the suction path by an air flow from the introduction path toward the suction path. Therefore, other granular particles than the granular particles in the discharge area assigned the group including the non-conforming granular particle can be prevented from being borne to the suction path, and the suction path can be prevented from sucking an excessive number of granular particles. As a result, the suction path can be prevented from being clogged with an excessive number of granular particles, and the sorting device can avoid being unable to sort a conforming granular particle from among a plurality of granular particles.

DESCRIPTION OF EMBODIMENTS

Embodiment

In the following, an overview of a sorting device 100 according to an embodiment of the present invention will be described with reference to FIGS. 1 and 5.

Figure 1:
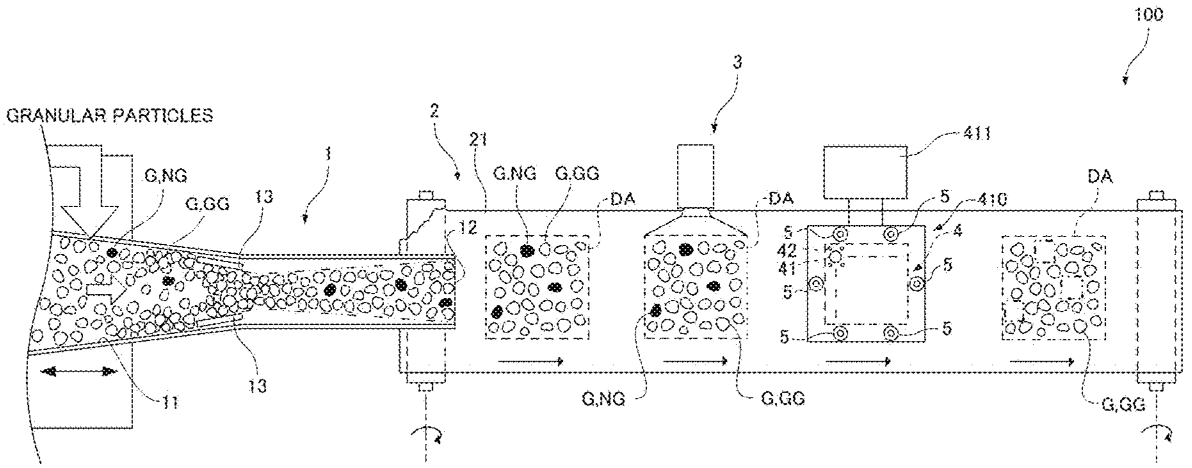
FIG. 1 is a plan view showing an overview of a sorting device according to an embodiment.

The sorting device 100 shown in FIG. 1 identifies a non-conforming granular particle NG while conveying a plurality of granular particles G spread on a belt conveyor 2. In addition, the sorting device 100 sucks and removes the non-conforming granular particle NG from the plurality of granular particles G through a suction path 41 of a housing 4 shown in FIG. 5 as described later, thereby sorting a conforming granular particle GG from the plurality of granular particles G. When the sorting device 100 sucks and removes the non-conforming granular particle NG, some amount of conforming granular particles GG around the non-conforming granular particle NG are also sucked and removed. The suction path 41 of the housing 4 corresponds to a suction port of the conventional nozzle described above for sucking the granular particles G. On the downstream side of the suction path 41, a path (removal path 10) through which the granular particles G and air sucked through the housing 4 pass is provided, and the suction path 41 also forms a part of the removal path 10.

As with the conventional nozzle, if the removal path 10 is clogged with the granular particles G or the belt conveyor 2 is sucked up toward the removal path 10 and lifted, the sorting device 100 shown in FIG. 1 may be unable to remove the non-conforming granular particle NG and sort the conforming granular particle GG from the plurality of granular particles G. Specifically, when the removal path 10 shown in FIG. 5 is clogged with the granular particles G, air cannot pass through the removal path 10. As a result, the sorting device 100 cannot suck the plurality of granular particles G from the belt conveyor 2, cannot remove the non-conforming granular particle NG, and therefore cannot sort the conforming granular particle GG from the plurality of granular particles G. When the belt conveyor 2 is lifted, the plurality of granular particles G on the belt conveyor 2 are scattered off the belt conveyor 2. Once the granular particles G are scattered off the belt conveyor 2, the sorting device 100 cannot sort the conforming granular particle GG from among the plurality of granular particles G, since there are no granular particles G on the belt conveyor 2.

In order to prevent the removal path 10 from being clogged, first, as shown in FIG. 1, the plurality of granular particles G are uniformly put in a predetermined region DA on the belt conveyor 2. When the plurality of granular particles G are uniformly put in the predetermined region DA on the belt conveyor 2, an excessive number of granular particles G are prevented from being sucked at some moment, unlike the case where a larger number of granular particles G are put in a certain region than in the other region on the belt conveyor 2. Therefore, the removal path 10 can be prevented from being clogged with the granular particles G because of an excessive number of granular particles G being sucked into the removal path 10 in a short time.

Figure 5:
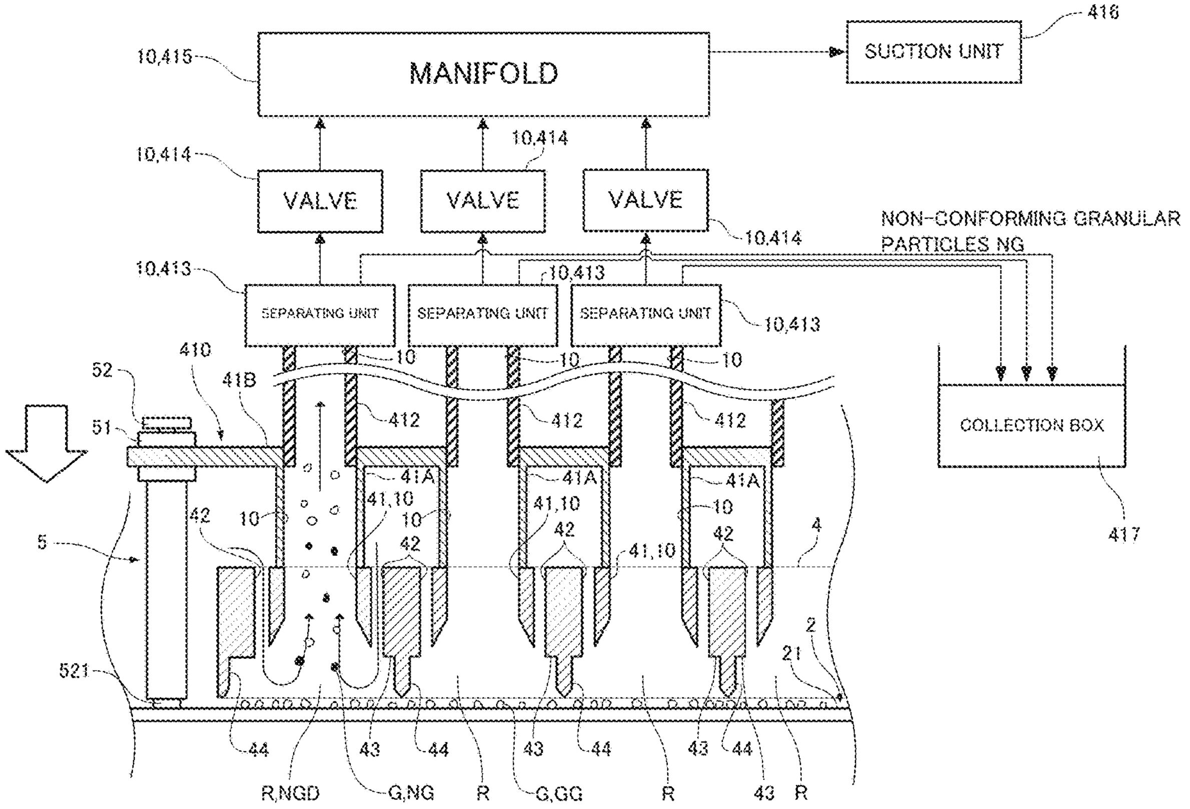
FIG. 5 is a schematic diagram showing a cross section of the housing and a part of the sorting device according to the embodiment, showing non-conforming granular particles being sucked into a suction path.

In order to prevent the removal path 10 from being clogged, second, as shown in FIG. 5, the plurality of granular particles G on the belt conveyor 2 are divided into a plurality of groups. The housing 4 includes a plurality of suction paths 41, and the suction paths 41 suck in the plurality of granular particles G on a group basis. Therefore, a larger number of granular particles G than the number of granular particles assigned to one group is not sucked into any suction path 41, so that an excessive number of granular particles G can be prevented from being sucked into a particular suction path 41.

In order to prevent the removal path 10 from being clogged, third, the granular particles G and air having passed through the removal path 10 are separated and discharged from the removal path 10. The discharged granular particles G are collected in a collection box 417 described later. Since the granular particles G and air are separated and discharged to the collection box 417, the plurality of granular particles G can be prevented from being accumulated in the removal path 10 and causing clogging of the removal path 10.

Figure 6:
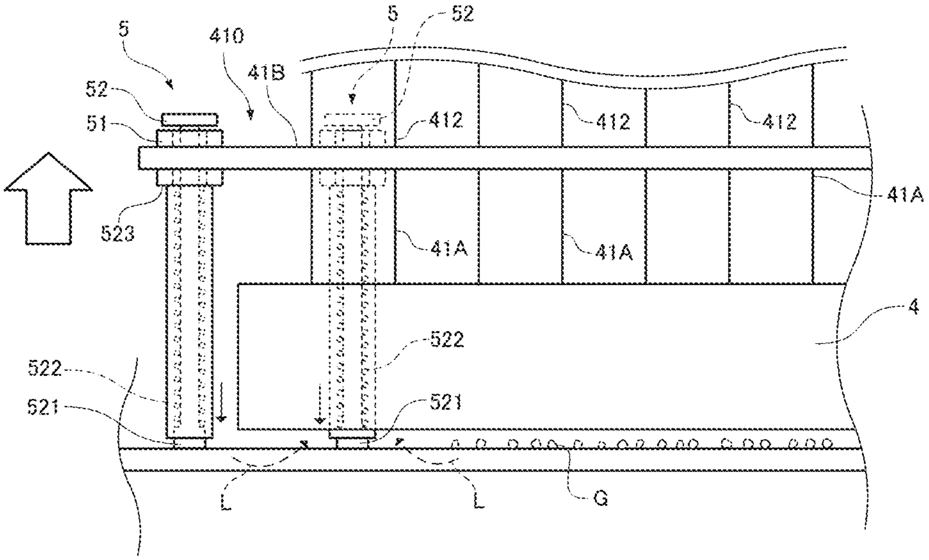
FIG. 6 is a side view of a part of the sorting device according to the embodiment, showing the housing and a periphery thereof when a suppressor prevents a lift of a belt conveyor.

In order to prevent a lift L of the belt conveyor 2 when the granular particles G are sucked into the suction path 41 shown in FIG. 6, the lift L of the belt conveyor 2 is suppressed. The lift L of the belt conveyor 2 occurs while the granular particles G are being sucked into the suction path 41 as shown in FIG. 5 and when the pressure of the air in the suction path 41 is lower than the pressure around the housing 4 after the granular particles G are sucked into the suction path 41. Therefore, the lift L of the belt conveyor 2 is suppressed in a period from when the granular particles G start being sucked into the suction path 41 to when the pressure of the air in the suction path 41 becomes substantially equal to the pressure of the air around the housing 4. In this way, the lift L of the belt conveyor 2 is prevented.

Configurations of units and components forming the sorting device 100 according to the embodiment will be described with reference to FIGS. 1 to 7.

As shown in FIG. 1, the sorting device 100 includes a feeder 1, the belt conveyor 2, an identification unit 3, the housing 4, various mechanical elements (see FIG. 5), and a suppressor 5. The feeder 1 feeds the plurality of granular particles G including the non-conforming granular particle NG to the belt conveyor 2. The belt conveyor 2 conveys the plurality of granular particles G fed from the feeder 1. The identification unit 3 identifies the non-conforming granular particle NG from among the plurality of granular particles G conveyed by the belt conveyor 2. The housing 4 is an object for sucking in the non-conforming granular particle NG from the plurality of granular particles G conveyed by the belt conveyor 2. A suction unit 416 (see FIG. 5) produces an air flow that allows sucking in of the non-conforming granular particle NG. The various mechanical elements (see FIG. 5) connect the suction unit 416 to the housing 4. The suppressor 5 prevents the lift L of the belt conveyor 2 shown in FIG. 6.

The feeder 1 is a gutter-like structure, and a groove part of the gutter-like structure forms a path (feed path 11) through which the plurality of granular particles G moves. The granular particles G can move in the longitudinal direction of the feed path 11. The width of the feed path 11 decreases as it goes from the upstream side toward the downstream side along the direction of movement of the granular particles G and is constant in a downstream part of the feed path 11 starting from a midpoint in the direction of movement of the granular particles G. The feeder 1 vibrates in the longitudinal direction of the feed path 11, thereby making the plurality of granular particles G on the feed path 11 move toward a feed path outlet 12 located on the downstream side of the feed path 11.

The feeder 1 has a guide 13. The guide 13 guides the granular particles G in such a direction that the plurality of granular particles G are uniformly spread in the width direction of the feed path 11 when the plurality of granular particles G moving on the feed path 11 reach the feed path outlet 12. The specific position where the guide 13 is provided and the specific direction in which the guide 13 guides the granular particles G are determined based on the direction in which the plurality of granular particles G tend to move in the feed path 11. For example, with the feeder 1 shown in FIG. 1, the plurality of granular particles G tend to move toward the opposite ends in the width direction of the feed path 11. When the plurality of granular particles G tend to move in this way in the feed path 11, the guide 13 is required to move the plurality of granular particles G toward the central part in the width direction of the feed path 11 at a midpoint in the direction of movement of the granular particles G, thereby preventing the granular particles G from being concentrated at the opposite ends in the width direction of the feed path 11. Therefore, at a midpoint in the direction of movement of the granular particles G along the feed path 11, the guide 13 is implemented in the form of two plate-like structures provided on the opposite sides of the feed path 11 to make the width of the feed path 11 in which the plurality of granular particles G can move smaller in the downstream part than in the upstream part.

The belt conveyor 2 has a belt 21 that conveys the plurality of granular particles G fed from the feeder 1 and put on an upper surface thereof. The belt 21 is disposed below the feed path outlet 12 so that the belt 21 receives the plurality of granular particles G dropping off the feed path outlet 12 at the upper surface thereof and conveys the granular particles G in the same direction as the direction in which the feeder 1 moves the granular particles G. At the feed path outlet 12, the plurality of granular particles G are uniformly spread in the width direction of the feed path 11. Therefore, the plurality of granular particles G having dropped on the upper surface of the belt 21 from the feed path outlet 12 are also uniformly spread on the upper surface of the belt 21 in the width direction of the belt 21. As described later, the belt 21 receives the granular particles G dropping from the feeder 1 while moving in the direction of conveyance. Thus, the granular particles G are uniformly spread in the direction of conveyance of the belt 21. Therefore, the plurality of granular particles G can be put on the upper surface of the belt 21 in such a manner that the granular particles G are uniformly spread in the predetermined region DA. The frequency of the vibration of the feeder 1 for moving the granular particles G, the position where the guide 13 is provided, and the speed of movement of the belt 21 can be appropriately adjusted according to the tendency of the movement of the granular particles G. By adjusting these, the feeder 1 can put the plurality of granular particles G on the upper surface of the belt 21 in such a manner that the granular particles G are uniformly spread in the predetermined region DA.

Figure 2:
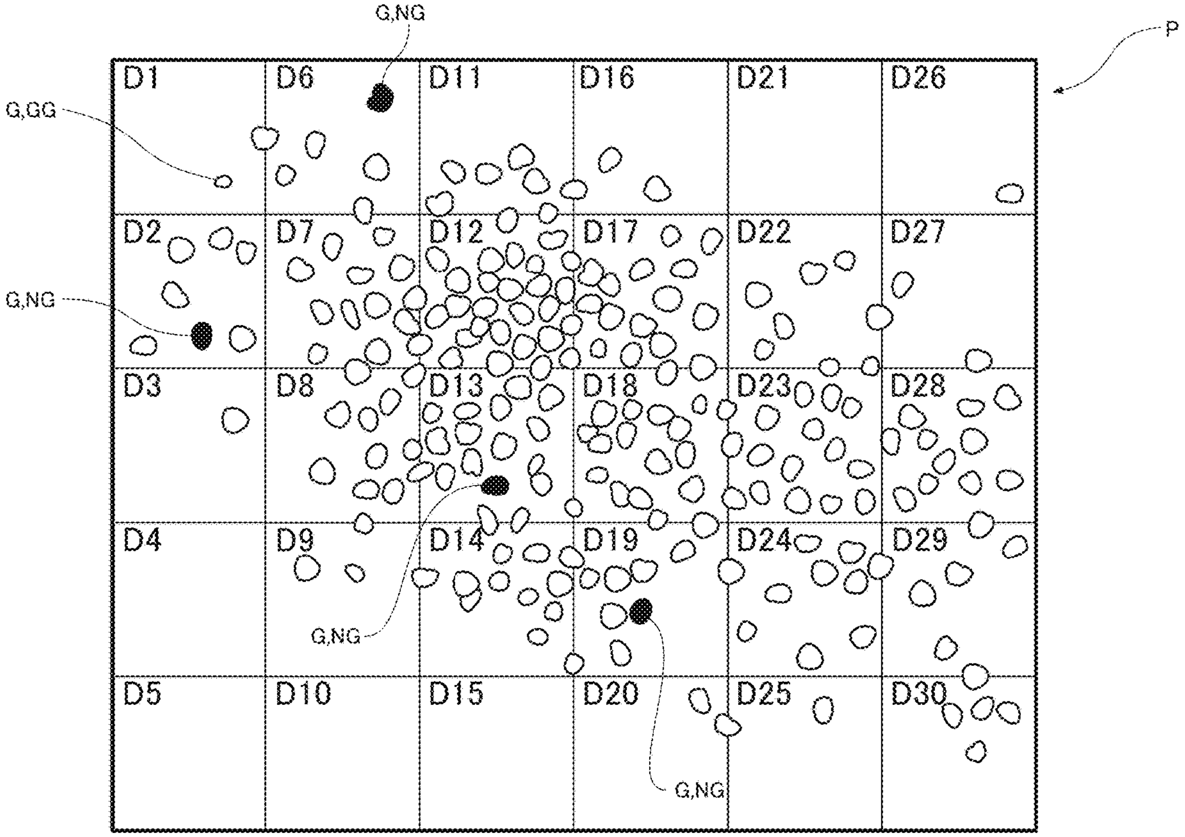
FIG. 2 is a diagram showing an image taken by an identification unit.

The identification unit 3 includes a camera that takes an image of the plurality of granular particles G put on the upper surface of the belt 21. As shown in FIG. 2, the identification unit 3 identifies the non-conforming granular particle NG from among the plurality of granular particles G in an image P taken by the camera, divides the image P into a plurality of areas (image areas), and locates an image area including the non-conforming granular particle NG. Specifically, for example, when the granular particles G are grains of wheat, the color of the grains of wheat is a standard for determining whether a grain of wheat is a non-conforming granular particle NG or not. In the example shown in FIG. 2, black grains of wheat are non-conforming granular particles NG. The identification unit 3 identifies black grains of wheat as non-conforming granular particles NG from among a plurality of grains of wheat in the image P taken by the camera, divides the image P into a plurality of image areas from an image area D1 to an image area D30, and determines that an image area D2, an image area D6, an image area D13 and an image area D19 include a non-conforming granular particle NG.

Figure 3:
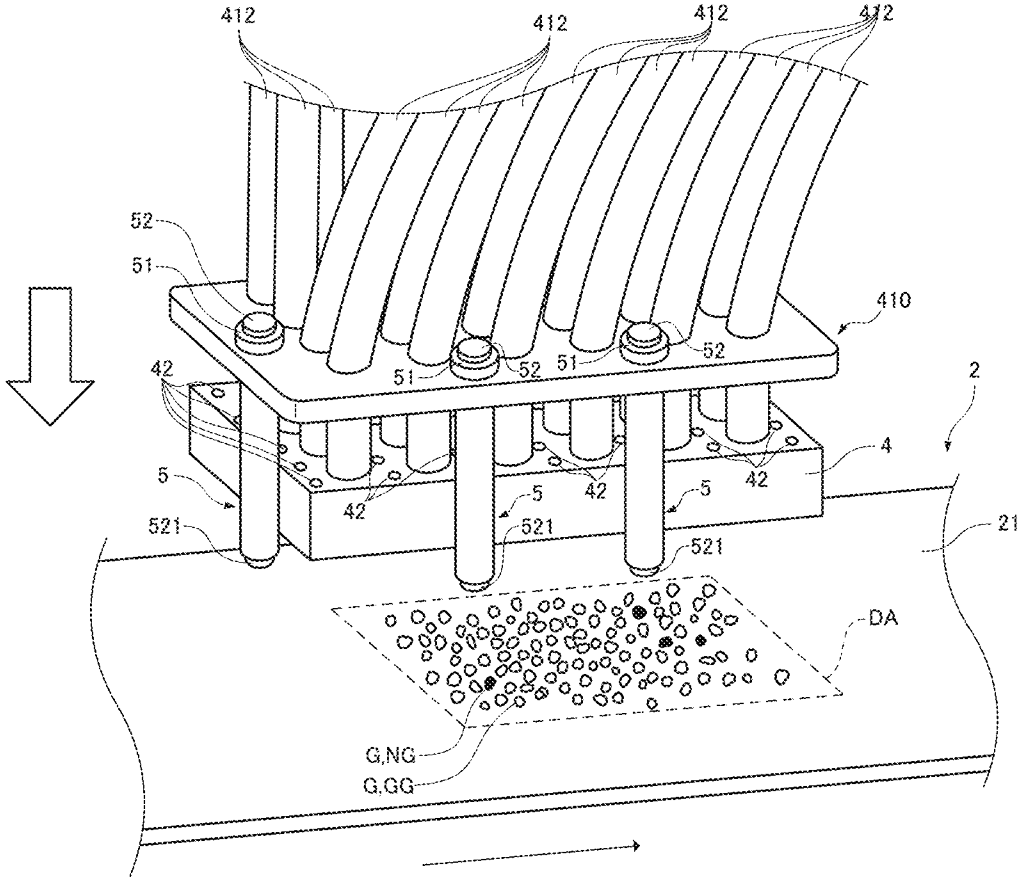
FIG. 3 is a perspective view of a part of the sorting device according to the embodiment, showing a housing and a periphery thereof.
Figure 4:
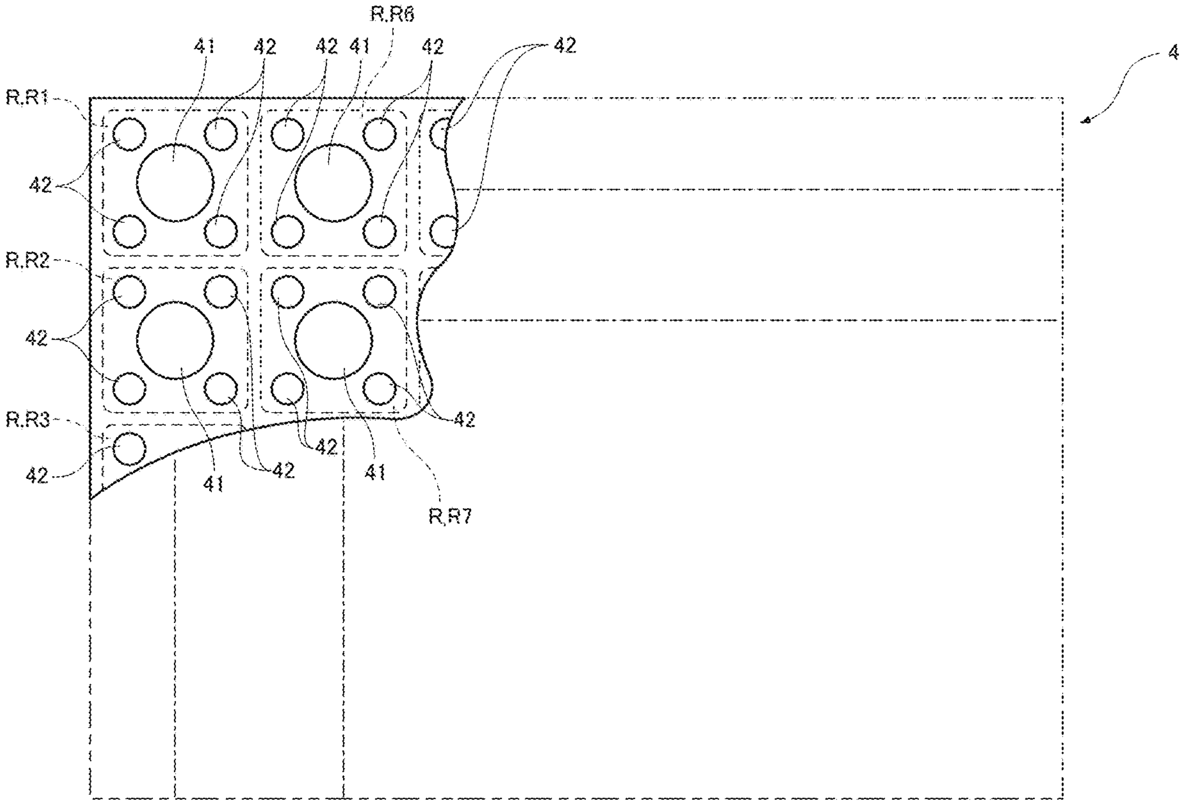
FIG. 4 is a plan view of the housing according to the embodiment.

As shown in FIG. 3, the housing 4 is a box having a bottom surface that has an area equal to or larger than the area of the region DA in which the plurality of granular particles G are put on the upper surface of the belt 21. As shown in FIGS. 4 and 5, the housing 4 has a plurality of rooms R, a suction path 41, and an introduction path 42. The plurality of rooms R are a plurality of discharge areas that cover the plurality of granular particles G put on the upper surface of the belt 21 (see FIG. 5) from above and divides the granular particles G into a plurality of groups. The suction path 41 is a part of the removal path 10 and is connected to the room R. The introduction path 42 is a path that connects the room R to a space outside the room R.

As shown in FIG. 5, the plurality of granular particles G put on the upper surface of the belt 21 are sucked into the removal path 10 through the suction path 41 of the housing 4 described later when the housing 4 is located at a position (sucking position) to cover the granular particles G from above. Specifically, the sucking position is a position of the housing 4 for sucking the granular particles G. More specifically, the sucking position is a position of the housing 4 where the plurality of granular particles G put on the upper surface of the belt 21 are completely covered from above and the clearance between the upper surface of the belt 21 and the bottom surface of the housing 4 is minimized to the extent that the granular particles G are not crushed by the housing 4.

A positioning unit 411 is a unit for positioning the housing 4 at the sucking position, and as shown in FIG. 1, the housing 4 is held by the positioning unit 411 via an adapter 410 described later connected to an upper part of the housing 4. The positioning unit 411 normally keeps the housing at a position where the housing 4 does not inhibit the conveyance of the granular particles G by the belt conveyor 2 as shown in FIG. 3, and positions the housing 4 at the sucking position to remove the non-conforming granular particle NG from the upper surface of the belt 21 as shown in FIG. 5. Specifically, the positioning unit 411 moves the housing 4 back and forth in the vertical direction between a position where the housing 4 is separated away from the belt 21 (see FIG. 3) and a position where the housing 4 is close to the belt 21 (see FIG. 5).

As shown in FIG. 5, the discharge area is the room R formed by making a hollow in a certain region of the bottom surface of the housing 4, and a plurality of discharge areas are arranged as spaces for dividing the plurality of granular particles G into a plurality of groups corresponding to the image areas set by the identification unit 3 in top view when the housing 4 is positioned at the sucking position. The room R in FIG. 5 is a square-shaped recess in a part of the bottom surface of the housing 4 when the housing 4 is viewed from below. A square-shaped surface of the housing 4 that faces the upper surface of the belt 21 when the housing 4 is positioned at the sucking position is referred to as an inner upper surface 43, and a surface of the housing 4 that intersects with the inner upper surface 43 and surround the room R in the front, rear, left and right directions is referred to as an inner side surface 44. The number of the rooms R is the same as the number of the image areas, each room R has the same area as the actual area of the region captured in the image area, and the rooms R are arranged in the bottom surface of the housing 4 in the same arrangement as the image areas.

The plurality of granular particles G are put in the predetermined region DA on the upper surface of the belt 21 as shown in FIG. 3, and when the housing 4 is positioned at the sucking position as shown in FIG. 5, each room R is assigned a group of granular particles G. The granular particles G included in each group correspond to a group of granular particles G included in the image area that corresponds to that group. Specifically, when the housing 4 is positioned at the sucking position, granular particles G included in a group below a room R2 correspond to a group of granular particles G included in an image area D2 shown in FIG. 2. Therefore, by sucking the group of granular particles G assigned to the room R that corresponds to the image area including a non-conforming granular particle NG as shown in FIG. 5, the non-conforming granular particles NG can be removed from all the granular particles G put in the predetermined region DA on the upper surface of the belt 21.

As shown in FIG. 5, the suction path 41 is a path that is in communication with the room R and through which air and granular particles G in the room R assigned a group including a non-conforming granular particle NG are sucked. The suction path 41 is a through-hole that extends upward from the room R and penetrates through the housing 4 from the inner upper surface 43. The suction path 41 in FIG. 5 is provided in the vicinity of the center of the inner upper surface 43. The center of the inner upper surface 43 means the position at which the two diagonals of the square-shaped inner upper surface 43 intersect with each other.

The suction path 41 is connected to the suction unit 416 that produces an air flow that allows sucking the non-conforming granular particle NG and various mechanical elements that connect the suction unit 416 to the housing 4. The suction unit 416 and the various mechanical elements that connects the housing 4 to the suction unit 416 will be described in detail later. The suction unit 416 produces an air flow from the room R toward the suction path 41. The air flow produced by the suction unit 416 makes the air and granular particles G in the room R assigned a group including a non-conforming granular particle NG be sucked into the suction path 41.

Each room R is preferably provided with at least one suction path 41. When each room R is provided with a suction path 41, the group of granular particles G assigned to the room R is sucked into the suction path 41 provided for the room R. In other words, each suction path 41 sucks the group of granular particles G assigned to the suction path 41. Therefore, a particular suction path 41 can be prevented from sucking a plurality of groups of granular particles G and thus causing clogging of the removal path 10 including the suction path 41 with the granular particles G. Furthermore, when each room R is provided with a plurality of suction paths 41, the plurality of granular particles G assigned to each room R are sucked into the plurality of suction paths 41. Therefore, the number of granular particles G sucked into each suction path 41 is smaller than that when each room R is provided with one suction path 41. That is, providing each room R with a plurality of suction paths 41 has an advantage that the removal path 10 is less likely to be clogged with granular particles G compared with the case where each room R is provided with one suction path 41.

The introduction path 42 is a path that is in communication with the room R and introduces outside air to the room R. The introduction path 42 connects the room R shown in FIG. 5 to a space outside the room R as shown in FIGS. 3 and 5. Once the room R and the space outside the room R are connected to each other, when the air in the room R is sucked in the suction path 41 and the pressure of the air in the room R decreases, the air in the space outside the room R that is at a higher pressure than the air in the room R flows into the room R through the introduction path 42 in communication with the room R. The air flowing into the room R through the introduction path 42 flows toward the suction path 41 together with the granular particles G in the room R borne thereby. That is, as a result of the air in the room R being sucked into the suction path 41, an air flow occurs from the introduction path 42 in communication with the room R toward the suction path 41 in communication with the room R. However, if the room R and the space outside the room R are not connected by the introduction path 42, when the air is sucked into the suction path 41, an air flow from the outside of the room R into the room R occurs in a part other than the introduction path 42. For example, if an air flow from the outside of the room R into the room R occurs between the housing 4 and the upper surface of the belt 21, the air flow may pass by a plurality of rooms R, and granular particles G in the plurality of rooms R may be borne by the air flow to a particular suction path 41 and cause clogging of the particular suction path 41. In short, by providing the introduction path 42, an air flow that passes by a plurality of rooms R can be prevented from occurring, and therefore, the removal path 10 including a particular suction path 41 can be prevented from being clogged with granular particles G.

As shown in FIG. 4, each room R is provided with a plurality of introduction paths 42, and the plurality of introduction paths 42 are preferably arranged around the suction path 41. The housing 4 in FIG. 4 has four introduction paths 42 arranged at positions around the suction path 41 in such a manner that each introduction path 42 is equally spaced apart from the adjacent introduction paths 42 and equally spaced apart from the suction path 41. Since the plurality of introduction paths 42 are arranged around the suction path 41, when the air in the room R is sucked into the suction path 41, an air flow occurs from each introduction path 42 around the suction path 41 toward the suction path 41. That is, air flows in a plurality of directions occur toward the suction path 41. The granular particles G in the room R are borne by the air flow toward the suction path 41 and sucked into the suction path 41. Therefore, if there are air flows toward the suction path 41 in a plurality of directions, more granular particles G are sucked into the suction path 41, compared with the case where there is only an air flow in one direction occurs toward the suction path 41. In other words, when there are a plurality of introduction paths 42, the part of the room R in which no air flow occurs, that is, air does not flow but stagnates is smaller and more granular particles G are borne by the air flows and sucked into the suction path 41 than when there is only one introduction path 42.

The introduction path 42 preferably penetrates through the housing 4 from outside of the housing 4 into the room R. With this configuration, as shown in FIG. 3, the room R is connected to the space outside the housing 4 by the introduction path 42. The pressure of the air in the space outside the housing 4 is the atmospheric pressure. Therefore, as shown in FIG. 5, when the air in the room R is sucked into the suction path 41 and the pressure of the air in the room R becomes lower than the atmospheric pressure, air outside the room R flows into the room R through the introduction path 42. If the introduction path 42 connects the room R to a space other than the outside of the housing 4, when the air in the room R is sucked into the suction path 41, the pressure of the air in the space connected to the room R may become lower than the pressure in the room R. In such a case, air needs to be actively fed into the room R, and a pump is required to this end. However, when the room R is connected to the outside of the housing 4, when the air in the room R is sucked into the suction path 41, the pressure in the room R always becomes lower than the atmospheric pressure, so that there is an advantage that air does not need to be actively fed into the room R, and a pump or the like does not need to be additionally provided in order to feed air into the room R. The introduction path 42 of the housing 4 shown in FIG. 5 is a through-hole that extends from the top of the housing 4 to the inner upper surface 43. Therefore, when the air in the room R is sucked into the suction path 41 along with the non-conforming granular particles NG, air in the space outside the housing 4 above the housing 4 is introduced to the suction path 41 through the introduction path 42.

In order to suck and collect a group of granular particles including a non-conforming granular particle NG from a plurality of granular particles G through the suction path 41, the housing 4 is connected to the suction unit 416 via various mechanical elements. The various mechanical elements include the adapter 410, a plurality of tubes 412, a plurality of separating units 413, a plurality of valves 414 and a manifold 415. The adapter 410 is connected to the housing 4. Each of the plurality of tubes 412 is in communication with one suction path 41 of the housing 4 via the adapter 410.

Each of the plurality of separating units 413 is in communication with one tube 412. Each of the plurality of valves 414 is in communication with one separating unit 413. The manifold 415 is in communication with the plurality of valves 414. Specifically, the removal path 10 described above is the path from the suction path 41 to the manifold 415, and there are a plurality of removal paths 10.

The adapter 410 has a plurality of pipes 41A and a holder part 41B. Each of the plurality of pipes 41A is connected to one suction path 41 of the housing 4. The holder part 41B holds the plurality of pipes 41A. A hollow portion of the pipe 41A forms a part of the removal path 10. The number of the pipes 41A is the same as the number of the suction paths 41 of the housing 4, and each of the plurality of pipes 41A is connected to the upper part of the housing 4 in such a manner that the hollow portion thereof is in communication with one suction path 41.

A hollow portion of the tube 412 forms a part of the removal path 10, and the tube 412 is connected to the housing 4 via the pipe 41A of the adapter 410 in such a manner that the hollow portion thereof is in communication with the suction path 41. The number of the tubes 412 is also the same as the number of the suction paths 41, and one end of each tube 412 is connected to one pipe 41A of the adapter 410. The other end of each tube 412 is connected to one of the separating units 413.

The separating unit 413 separates the air and granular particles G including a non-conforming granular particle NG sucked through the suction path 41. The separating unit 413 can separate the air and granular particles G sucked through the suction path 41 and direct the air to the suction unit 416 and the granular particles G to the collection box 417 for collecting granular particles G. In this way, the parts downstream of the separating units 413 to the suction unit 416 are prevented from being clogged with granular particles G. The separating unit 413 is an air filter or a cyclone centrifugal separator, for example. The separating unit 413 have only to be provided upstream of the mechanical elements that can be clogged with granular particles G. For example, if it is certain that the valves 414 or the manifold 415 are not clogged with granular particles G, the separating units 413 may be provided downstream of the valves 414 or the manifold 415.

Each valve 414 is connected to one separating unit 413 to open and close the removal path 10. When a removal path 10 connected to a valve 414 is connected to a room R assigned a group of granular particles including a non-conforming granular particle NG, the valve 414 opens to allow the air and granular particles G to flow to the removal path 10. On the other hand, when a removal path 10 connected to a valve 414 is not connected to a room R assigned a group of granular particles including a non-conforming granular particle NG, the valve 414 closes to block the air and granular particles G from flowing to the removal path 10. In this way, the valve 414 opens and closes the removal path 10, thereby allowing only a group of granular particles G including a non-conforming granular particle NG to be sucked into the suction path 41 of the housing 4. The valve 414 is a solenoid valve or the like, for example, and is controlled by the identification unit 3 or other controller (not shown) based on the determination result from the identification unit 3. The plurality of valves 414 are connected to the suction unit 416 via the manifold 415 through which air having passed through the valves 414 passes.

The suction unit 416 is a unit that sucks in air. The suction unit 416 is connected to each removal path 10, and therefore, when the suction unit 416 sucks in air, the air in the room R is sucked into the suction paths 41. The suction unit 416 is a vacuum pump, for example.

The suppressor 5 suppresses the lift L of the belt 21 of the belt conveyor 2 that occurs when the plurality of granular particles G are sucked into the suction paths 41 at a plurality of positions around the housing 4, as shown in FIG. 6. The suppression of the lift L of the belt 21 is achieved by pressing the belt 21 from above at a plurality of positions around the housing 4. As shown in FIG. 1, in the embodiment, six suppressors 5 are used to press the belt 21 from above at six positions around the housing 4. Since the suppressors 5 suppress the lift L of the belt 21, the lift L of the belt 21 does not occur. Therefore, the plurality of granular particles G put on the belt 21 can be prevented from being scattered because of the lift L of the belt 21.

As shown in FIG. 6, the suppressor 5 has a presser 52 held by the holder part 41B of the adapter 410 via a holding member 51. The holder part 41B of the adapter 410 has a through-hole that penetrates the holder part 41B in the thickness direction at a position at which the suppressor 5 is held by the holder part 41B. The holding member 51 has a cylindrical shape and is attached to the holder part 41B in such a manner that the hollow portion thereof is in communication with the through-hole in the holder part 41B and a flat portion of the holding member 51 is in contact with the upper surface of the holder part 41B.

The presser 52 has a main body 521 held by the holding member 51, an elastic part attached to the main body 521, and a receiving part 523 that holds the elastic part 522 between the receiving part 523 and the main body 521. The main body 521 has the shape of a rod with disks attached to the opposite ends. The elastic part 522 is a member that shrinks while producing a repulsive force when a force is applied in the vertical direction. FIG. 6 shows a coil spring as an example of the elastic part 522. The inner diameter of the elastic part 522 is greater than the outer diameter of the rod portion of the main body 521 and smaller than the outer diameter of the disk portions of the main body 521. The receiving part 523 is a cylinder, and the inner diameter of a hollow portion of the receiving part 523 is smaller than the outer diameter of the elastic part 522. The receiving part 523 is attached to the holder part 41B in such a manner that the hollow portion thereof is in communication with the through-hole of the holder part 41B and a flat portion of the receiving part 523 is in contact with the lower surface of the holder part 41B. The main body 521 is held by the holder part 41B in such a manner that the rod portion thereof passes through the hollow portion of the elastic part 522, which is a coil spring, one end of the elastic part 522 is in contact with one of the disk portions of the main body 521, and the other end of the elastic part 522 is in contact with a lower flat portion of the receiving part 523. The main body 521 is held by the holder part 41B by the rod portion passing through the hollow portions of the receiving part 523, the holder part 41B and the holding member 51 and a lower flat portion of the disk portion at the upper end of the main body 521 hooked on an upper flat portion of the holding member 51. Since the holder part 41B holds the presser 52 in this way, the holding member 51 suppresses a downward movement of the main body 521, and the elastic part 522 suppresses an upward movement of the main body 521. In other words, the main body 521 can move in the vertical direction within the range determined by the holding member 51 and the elastic part 522. Furthermore, when the suppressor 5 is disposed at the position to press the belt 21 from above, the main body 521 suppresses the lift L of the belt 21 with the repulsive force of the elastic part 522 pressing the upper surface of the belt 21. The presser 52 can have any structure that produces a repulsive force when a force is applied in the vertical direction.

The length of the elastic part 522 in the direction of shrinking is preferably a length that allows the main body 521 to press the belt 21 from when the housing 4 leaves the sucking position to when the pressure of the air in the suction path 41 becomes substantially equal to the pressure of the air around the housing 4. With the elastic part 522 having such a length in the direction of shrinking, the main body 521 can press the belt 21 from above when the pressure of the air in the suction path 41 is lower than the pressure of the air around the housing 4 or in other words when the lift L of the belt 21 can occur, thereby suppressing the lift L of the belt 21.

To press the belt 21 from above, the suppressor 5 need not be attached to the adapter 410, and an actuator unit (not shown) that can hold and move the suppressor 5 may be used. The actuator unit moves the suppressor 5 back and forth between a position where the suppressor 5 presses the belt 21 from above and a position where the suppressor 5 is separated from the belt 21. The lift L of the belt 21 is suppressed by the actuator unit positioning the suppressor 5 at the position where the suppressor 5 presses the belt 21 from above. The actuator unit can keep the suppressor 5 at the position where the suppressor 5 presses the belt 21 from above for an arbitrary time. Therefore, if the actuator unit is used, the lift L of the belt 21 can be advantageously suppressed for an arbitrary time.

The suppression of the lift L of the belt 21 can be achieved by pulling the belt 21 from below, rather than pressing the belt 21 from above. To pull the belt 21 from below, for example, a pulling unit (not shown) is used which pulls the belt 21 at the opposite position to the position of the housing 4 covering the belt 21 from above, that is, which sucks to pull the belt 21 from below the belt 21. By the pulling unit pulling the belt 21 downward, the lift L of the belt 21 is suppressed. If the pulling unit is used, there is no need to suppress the lift of the belt 21 from above, so that there is no need to reserve a region on the belt 21 for contact with the suppressor 5, the region DA in which the plurality of granular particles G are put and spread can be widened, and accordingly, more granular particles G can be put in the widened region DA for sorting.

An operation of the sorting device 100 will be described with reference to FIGS. 1, 3, 5 and 6.

As shown in FIG. 1, the feeder 1 first feeds a plurality of granular particles G onto the belt 21 of the belt conveyor 2, and the sorting device 100 then locates an area including a non-conforming granular particle NG and removes the group including the non-conforming granular particle NG while the belt conveyor 2 is conveying the granular particles G. Since the group including a non-conforming granular particle NG is removed from the upper surface of the belt 21, only conforming granular particles GG remain on the upper surface of the belt 21. The user of the sorting device 100 can sort only the conforming granular particles GG from the plurality of granular particles G by collecting the conforming granular particles GG remaining on the upper surface of the belt 21 in some manner.

The feeder 1 vibrates to make the plurality of granular particles G including a non-conforming granular particle NG on the feed path 11 move toward the feed path outlet 12. As the granular particles G in the upstream part of the feed path 11 moves toward the feed path outlet 12, the granular particles G gradually moves over to the opposite ends in the width direction of the feed path 11. The plurality of granular particles G moving toward the feed path outlet 12 is guided to move toward the central part in the width direction of the feed path 11 by the guide 13 provided at a midpoint in the direction of movement of the granular particles G along the feed path 11. As the plurality of granular particles G once guided by the guide 13 further move toward the feed path outlet 12, the plurality of granular particles G gradually move over from the central part in the width direction of the feed path 11 to the opposite ends in the width direction of the feed path 11, and are uniformly arranged in the width direction of the feed path 11 when the granular particles G reach the feed path outlet 12. The granular particles G having reached the feed path outlet 12 drop from the feed path outlet 12 onto the upper surface of the belt 21 of the belt conveyor 2.

The belt conveyor 2 receives the plurality of granular particles G dropping from the feed path outlet 12 of the feeder 1 on the upper surface of the belt 21 while the belt 21 is moving in the direction of conveyance so that the plurality of granular particles G are uniformly put in the predetermined region DA on the belt 21. The belt 21 receives the plurality of granular particles G fed from the feeder 1 while moving in the direction of conveyance so that the plurality of granular particles G put on the upper surface thereof are uniformly spread in the direction of conveyance. Therefore, the plurality of granular particles G put on the upper surface of the belt 21 are uniformly spread not only in the width direction of the belt 21 but also in the direction of conveyance. In other words, the plurality of granular particles G fed from the feeder 1 to the upper surface of the belt 21 are put on the belt 21 in such a manner that the granular particles G are uniformly spread in the predetermined region DA of the upper surface of the belt 21.

The plurality of granular particles G put in the predetermined region DA of the upper surface of the belt 21 are conveyed to a position (imaging position) where the identification unit 3 takes an image of the plurality of granular particles G, and at the imaging position, the identification unit 3 locates an image area including a non-conforming granular particle NG. The identification unit 3 takes an image of the plurality of granular particles G conveyed to the imaging position. As shown in FIG. 2, the identification unit 3 identifies a non-conforming granular particle NG in the taken image P, divides the image P into a plurality of image areas, and locates an image area including the non-conforming granular particle NG. Once the image area including the non-conforming granular particle NG is located, the plurality of granular particles G are conveyed to a position (removal position) where the non-conforming granular particle NG is sucked into the removal path 10.

As shown in FIGS. 3 and 5, having conveyed the plurality of granular particles G to the removal position, the belt 21 is temporarily stopped moving in the direction of conveyance. While the plurality of granular particle G are stopped at the removal position, the positioning unit 411 moves the housing 4 to the sucking position. Since the housing 4 is positioned at the sucking position while the movement of the belt 21 is stopped, the suppressor 5 does not inhibit the movement of the belt 21. Therefore, the lift L of the belt 21 can be prevented which would occur if the suppressor 5 presses the belt 21 while the belt 21 is moving and causes the belt 21 to become twisted at the point of pressing.

While the housing 4 is disposed at the sucking position, the group of granular particles G assigned to the room R (non-conforming granular particle discharge area NGD) corresponding to the image area including the non-conforming granular particle NG is sucked in the suction path 41 provided for the non-conforming granular particle discharge area NGD along with the air in the non-conforming granular particle discharge area NGD. When the housing 4 is disposed at the sucking position, the valve 414 that closes the removal path 10 for the non-conforming granular particle discharge area NGD opens. While the housing 4 is disposed at the sucking position, the suction unit 416 are producing an air flow that allows sucking in of the non-conforming granular particle NG. Therefore, when the valve 414 of the removal path 10 connected to the non-conforming granular particle discharge area NGD opens, an air flow occurs from the non-conforming granular particle discharge area NGD to the suction unit 416 through the suction path 41 for the non-conforming granular particle discharge area NGD.

Once the air flow occurs from the non-conforming granular particle discharge area NGD toward the suction path 41 for the non-conforming granular particle discharge area NGD, the pressure of the air in the non-conforming granular particle discharge area NGD becomes lower than the pressure of the air outside of the housing 4, so that the air outside of the housing 4 is introduced into the non-conforming granular particle discharge area NGD through the introduction path 42 provided for the non-conforming granular particle discharge area NGD. That is, when the pressure of the air in the non-conforming granular particle discharge area NGD decreases, the air that makes the pressure of the air in the non-conforming granular particle discharge area NGD equal to the pressure of the air outside of the housing 4 passes through the introduction path 42 for the non-conforming granular particle discharge area NGD and does not pass through the other rooms R. Therefore, no air flow occurs from the other rooms R than the non-conforming granular particle discharge area NGD to the non-conforming granular particle discharge area NGD, so that a group of granular particles G assigned to a room R other than the non-conforming granular particle discharge area NGD can be prevented from being sucked into the suction path 41 for the non-conforming granular particle discharge area NGD. Therefore, conforming granular particles GG included in a group of granular particles assigned to a room R other than the non-conforming granular particle discharge area NGD can be prevented from being sucked into the suction path 41 for the non-conforming granular particle discharge area NGD. In addition, the suction path 41 for the non-conforming granular particle discharge area NGD can be prevented from sucking a larger number of granular particles G than the sucking capacity thereof and being clogged with the granular particles G.

The air introduced into the non-conforming granular particle discharge area NGD through the introduction path 42 flows toward the suction path 41. The group of granular particles G assigned to the non-conforming granular particle discharge area NGD is borne by the air flow to the suction path 41 and sucked into the suction path 41. As shown in FIG. 4, the suction path 41 is located in the room R, four introduction paths 42 are disposed at four positions around the suction path 41 that are equally distant from the suction path 41 and equally distant from adjacent ones, and therefore, the air flow produced passes through most of the space in the room R. Therefore, in the group of granular particles G assigned to the non-conforming granular particle discharge area NGD, the number of granular particles G that are located in the space where the air does not flow and thus fail to be sucked into the suction path 41 decreases. In addition, since the plurality of granular particles G put on the upper surface of the belt 21 are uniformly spread, an excessive number of granular particles G are prevented from being sucked at some moment, unlike the case where a larger number of granular particles G are put in a certain region than in the other region of the upper surface of the belt 21. Therefore, the removal path 10 can be prevented from being clogged with the granular particles G because of an excessive number of granular particles G being sucked into the removal path 10 in a short time.

As shown in FIG. 5, when the air flow occurs from the non-conforming granular particle discharge area NGD toward the suction path 41 for the non-conforming granular particle discharge area NGD, The pressure of the air in the non-conforming granular particle discharge area NGD becomes lower than the pressure of the air outside of the housing 4, and that the belt 21 is pulled in the direction toward the non-conforming granular particle discharge area NGD, and a lift L of the belt 21 would otherwise occur as shown in FIG. 6. However, while the housing 4 is disposed at the sucking position, the suppressor 5 presses the belt 21 from above, and therefore, the lift L of the belt 21 is suppressed by the suppressor 5.

As shown in FIG. 5, the granular particles G including the non-conforming granular particle NG sucked in the suction path 41 for the non-conforming granular particle discharge area NGD pass through the removal path 10 including the suction path 41 and sucked into the separating unit 413. The separating unit 413 separates air and the granular particles G. The separated air flows to the suction unit 416, and the separated granular particles G flow to the collection box 417. Therefore, the part of the removal path 10 downstream of the separating unit 413, and the valve 414, the manifold 415 and the suction unit 416 downstream of the separating unit 413 can be prevented from clogged with the granular particles G.

As shown in FIG. 6, after the plurality of granular particles G are sucked in the suction path 41 of the housing 4, the positioning unit 411 shown in FIG. 1 moves the housing 4 away from the sucking position. When the housing 4 moves away from the sucking position, the suppressor 5 also moves with the housing 4 away from the position to press the belt 21 from above. However, the presser 52 of the suppressor 5 presses the belt 21 from above with the repulsive force produced by the elastic part 522. Therefore, the presser 52 continues pressing the belt 21 from above until the suppressor 5 moves to a position where the elastic part 522 produces no repulsive force, that is, a position where the shrunk elastic part 522 is restored to the original state. The length of the elastic part 522 in the direction of shrinking is a length that allows the main body 521 to press the belt 21 from when the housing 4 leaves the sucking position to when the pressure of the air in the suction path 41 becomes substantially equal to the pressure of the air around the housing 4. Therefore, the lift L of the belt 21 is suppressed by pressing the belt 21 from above when the pressure of the air in the suction path 41 is lower than the pressure of the air around the housing 4 or in other words when the lift L of the belt 21 can occur.

After the suppressor 5 leaves the position to press the belt 21 from above, the belt 21 restarts moving in the direction of conveyance. Therefore, the suppressor 5 does not inhibit the movement of the belt 21. Therefore, the lift L of the belt 21 can be prevented which would occur if the suppressor 5 presses the belt 21 while the belt 21 is moving and causes the belt 21 to become twisted at the point of pressing.

The granular particles G remaining on the upper surface of the belt 21 after the group of granular particles G including the non-conforming granular particle NG is sucked are only conforming granular particles GG. By collecting the conforming granular particles GG remaining on the upper surface of the belt 21, the conforming granular particles GG can be sorted from among the plurality of granular particles G including the non-conforming granular particle NG.

In the following, structures of variations 1 and 2 of the sorting device 100 according to the embodiment will be described with reference to FIGS. 7 to 9.

[Variation 1]

In the following, the variation 1 of the sorting device 100 according to the embodiment will be described with reference to FIG. 7. The sorting device 100 according to the variation 1 has a housing 6, which has a structure different from that of the housing 4 in FIG. 4.

Figure 7:
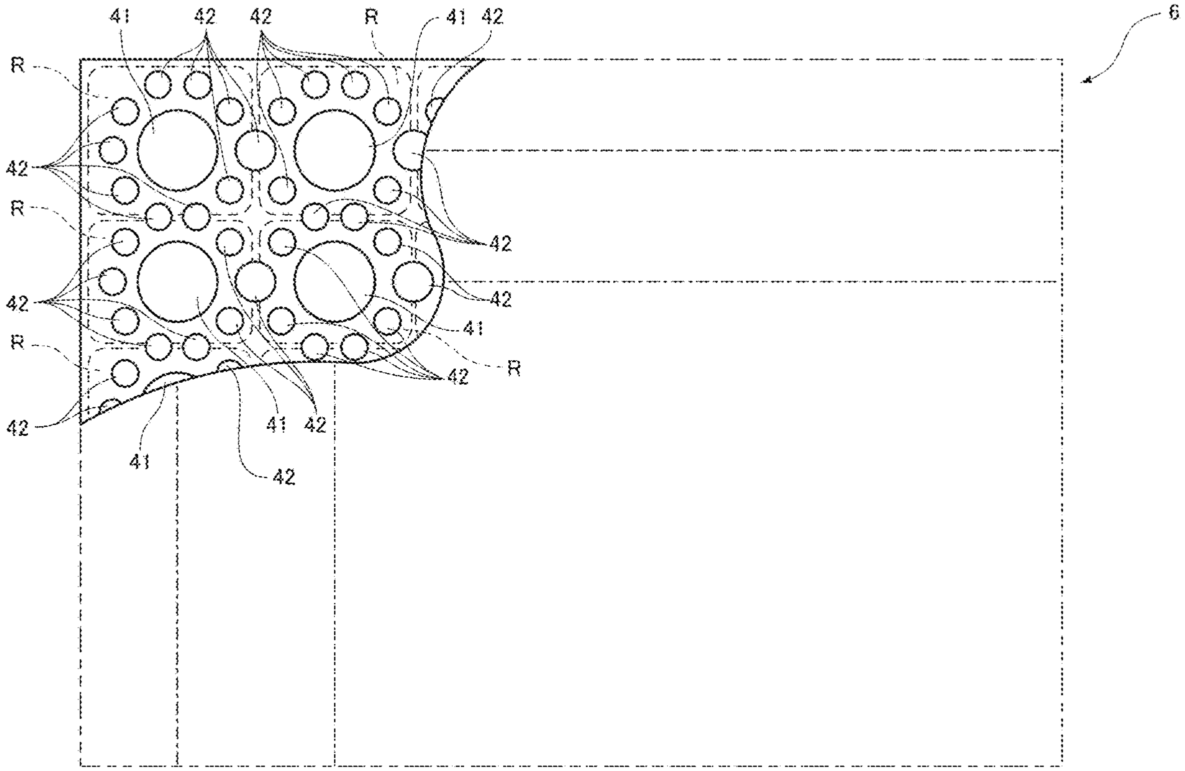
FIG. 7 is a plan view of a variation 1 of the housing according to the embodiment.
Figure 8:
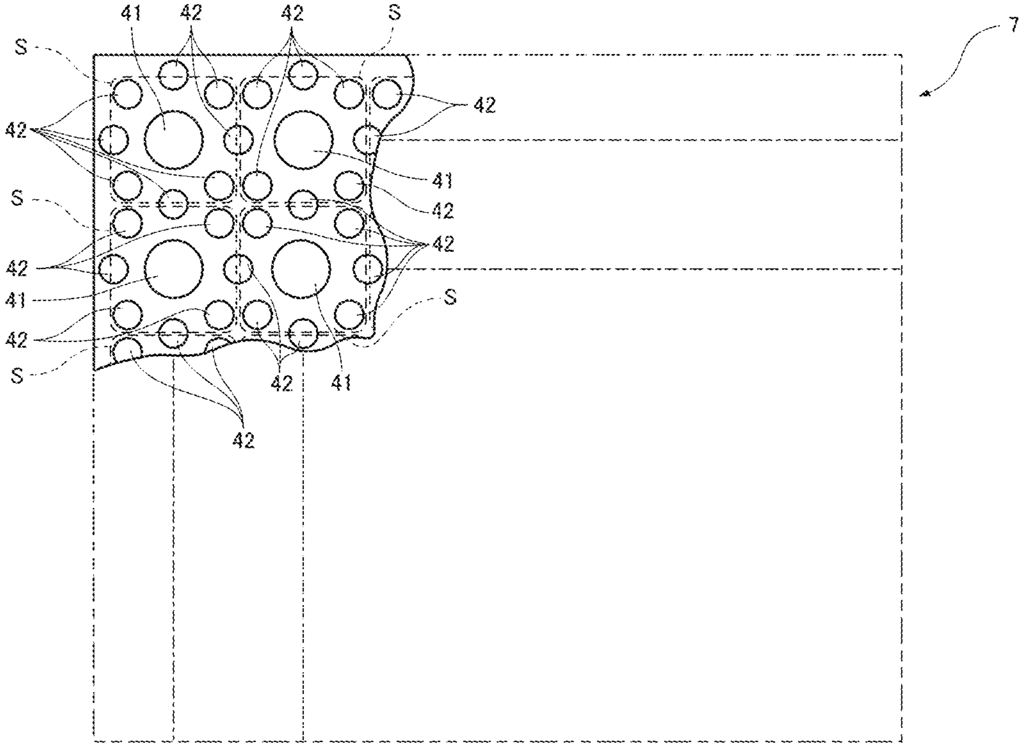
FIG. 8 is a plan view of a variation 2 of the housing according to the embodiment.

The housing 6 according to the variation 1 shown in FIG. 7 has more introduction paths 42 than the housing 4 in FIG. 4, and at least one of the introduction paths 42 is provided across the boundary between two different rooms R. In other words, at least one introduction path 42 is provided in communication with two different rooms R. If an introduction path 42 is provided across the boundary between two different rooms R, the introduction path 42 can have a larger passage cross-sectional area. When introducing air outside of the housing 4 into the rooms R through the introduction paths 42, the larger the number of the introduction paths 42, and the larger the passage cross-sectional area of the introduction paths 42, the more air flows into the rooms R through the introduction paths 42. The more the air flowing into the rooms R through the introduction paths 42, the shorter is the time required until the pressure of the air in the rooms R becomes substantially equal to the pressure of the air around the housing 6 after the pressure of the air sucked into the rooms R through the suction paths 41 decreases below the pressure of the air around the housing 6. Therefore, the period in which the lift L of the belt 21 shown in FIG. 6 can occur can be reduced.

[Variation 2]

In the following, the variation 2 of the sorting device 100 according to the embodiment will be described with reference to FIG. 8. The sorting device 100 according to the variation 2 has a housing 7, which has a structure different from that of the housing 4 in FIG. 4. As shown in FIG. 8, the housing 7 differs from the housing 4 in FIG. 4 in that the discharge area of the housing 7 is not a recess formed in the bottom surface of the housing 4 like the room R of the housing 4 in FIG. 4 but is a predetermined space S of the bottom surface of the housing 7. The discharge area in FIG. 8 is a space S of the bottom surface of the housing 7 that corresponds to each image area determined by the identification unit 3 in top view when the housing 7 is disposed at the sucking position. As with the rooms R provided in the housing 4 in FIG. 4, the number of the spaces S is the same as the number of the image areas, the space S has the same area as the actual area of the region captured in each image area, and the spaces S are arranged on the bottom surface of the housing 4 in the same arrangement as the image areas. The spaces S provided on the housing 7 according to the variation 2 are advantageous in that the housing 7 can be more easily manufactured than the housing 4 in FIG. 4, since there is no need to make a hollow in the bottom surface of the housing 7, unlike the rooms R provided in the housing 4 in FIG. 4. In addition, the number of introduction paths 42 of the housing 4 in the variation 2 is greater than the number of introduction paths 42 of the housing 4 in FIG. 4, and therefore, there is also an advantage that the part of the space below the spaces S where air stagnates when air is sucked into the space through the suction paths 41 is smaller compared with the housing 4 in FIG. 4.

Although an embodiment of the present invention has been described above, the present invention is not limited to the embodiment described above. Various modifications can be made as required without departing from the spirit of the present invention, that is, as far as the guide 13 guides the direction of movement of granular particles G on the feeder 1, the belt 21 receives a plurality of granular particles G dropping from the feed path outlet 12 while moving at a certain speed so that the plurality of granular particles G are uniformly put in the predetermined region DA of the upper surface of the belt 21, air outside of a non-conforming granular particle discharge area NGD is introduced into the non-conforming granular particle discharge area NGD through the introduction path 42 provided for the non-conforming granular particle discharge area NGD, and the suppressor 5 or other unit suppresses the lift L of the belt for a certain time.

The invention claimed is:

1. A sorting device, comprising:

a belt conveyor that conveys a plurality of granular particles spread in a predetermined region on the belt conveyor;

an identification unit that identifies a non-conforming granular particle in an image obtained by taking an image of the plurality of granular particles, the non-conforming granular particle being a granular particle that does not conform to a standard; and a housing disposed at a position to cover the granular particles on the belt conveyor from above, wherein the housing has:

a plurality of discharge areas arranged to divide the plurality of granular particles into a plurality of groups;

at least one suction path provided for each of the discharge areas, the at least one suction path provided for each discharge area being in communication with that discharge area, both air in each of the discharge areas that is assigned a group including the non-conforming granular particle and granular particles in that discharge area being sucked into the at least one suction path provided for that discharge area; and a plurality of introduction paths, wherein, for each of the discharge areas, a plurality of the introduction paths are in communication with the respective discharge area, air outside the respective discharge area being introduced to the respective discharge area through the plurality of the introduction paths in communication with the respective discharge area, wherein each of the introduction paths is disposed at a position to cover the granular particles on the belt conveyor from above, and wherein, for each of the discharge areas, the plurality of introduction paths in communication with the respective discharge area are arranged around the at least one suction path provided for the respective discharge area.

2. The sorting device according to claim 1, wherein, for each of the discharge areas, each of the plurality of introduction paths in communication with the respective discharge area penetrates through the housing from outside of the housing to the respective discharge area.

3. The sorting device according to claim 2, further comprising:

a plurality of separating units, each of the separating units corresponding to a respective suction path provided for one of the discharge areas, wherein each of the separating units separates air sucked through the respective suction path and the granular particles including the non-conforming granular particle sucked through the respective suction path.

4. The sorting device according to claim 1, wherein each of the discharge areas is provided with a single suction path, and for each of the discharge areas, the plurality of introduction paths in communication with the respective discharge area are arranged around the single suction path provided for the respective discharge area.

5. The sorting device according to claim 4, further comprising:

a plurality of separating units, each of the separating units corresponding to the single suction path provided for a respective one of the discharge areas, wherein each of the separating units separates air sucked through the corresponding single suction path and the granular particles including the non-conforming granular particle sucked through the corresponding single suction path.

6. The sorting device according to claim 1, further comprising:

a plurality of separating units, each of the separating units corresponding to a respective suction path provided for one of the discharge areas, wherein each of the separating units separates air sucked through the respective suction path and the granular particles including the non-conforming granular particle sucked through the respective suction path.

7. A sorting device, comprising:

an identification unit that identifies a non-conforming granular particle in an image obtained by taking an image of a plurality of granular particles, the non-conforming granular particle being a granular particle that does not conform to a standard; and a housing, wherein the housing has:

a plurality of discharge areas arranged to divide the plurality of granular particles into a plurality of groups;

a suction path that is in communication with a discharge area, air in a discharge area assigned a group including the non-conforming granular particle and granular particles in the discharge area assigned the group including the non-conforming granular particle being sucked into the suction path; and an introduction path that is in communication with a discharge area, air outside of the discharge area being introduced to the discharge area through the introduction path, the sorting device further comprising:

a belt conveyor that conveys the plurality of granular particles spread in a predetermined region on the belt conveyor; and a suppressor that suppresses a lift of the belt conveyor that occurs when the granular particles in the discharge area assigned the group including the non-conforming granular particle are sucked into the suction path of the housing disposed at a position to cover the granular particles on the belt conveyor from above.

8. The sorting device according to claim 7, wherein the suppressor suppresses the lift of the belt conveyor at a plurality of positions around the housing.

9. The sorting device according to claim 8, wherein the suppressor has:

a presser that presses the belt conveyor when the belt conveyor is being lifted.

10. The sorting device according to claim 9, further comprising:

an actuator unit that moves the presser to a position to press the belt conveyor from above to suppress the lift of the belt conveyor and then moves the presser upward away from the belt conveyor.

11. The sorting device according to claim 10, further comprising:

a separating unit that separates air sucked through the suction path and the granular particles including the non-conforming granular particle sucked through the suction path.

12. The sorting device according to claim 9, further comprising:

a separating unit that separates air sucked through the suction path and the granular particles including the non-conforming granular particle sucked through the suction path.

13. The sorting device according to claim 8, further comprising:

a separating unit that separates air sucked through the suction path and the granular particles including the non-conforming granular particle sucked through the suction path.

14. The sorting device according to claim 7, further comprising:

a feed path through which the plurality of granular particles pass, the feed path vibrating to make the plurality of granular particles pass through the feed path to feed the granular particles onto the belt conveyor; and a guide that guides the granular particles toward a central part in a width direction of the feed path.

15. The sorting device according to claim 14, further comprising:

a separating unit that separates air sucked through the suction path and the granular particles including the non-conforming granular particle sucked through the suction path.

16. The sorting device according to claim 7, further comprising:

a separating unit that separates air sucked through the suction path and the granular particles including the non-conforming granular particle sucked through the suction path.

* * * * *